United States Patent
Itakura

(10) Patent No.: US 8,085,334 B2
(45) Date of Patent: Dec. 27, 2011

(54) IMAGING APPARATUS

(75) Inventor: Keijirou Itakura, Osaka (JP)

(73) Assignee: Panasonic Corporation, Osaka (JP)

( * ) Notice: Subject to any disclaimer, the term of this patent is extended or adjusted under 35 U.S.C. 154(b) by 338 days.

(21) Appl. No.: 12/431,378

(22) Filed: Apr. 28, 2009

(65) Prior Publication Data

US 2010/0053402 A1    Mar. 4, 2010

(30) Foreign Application Priority Data

Aug. 28, 2008   (JP) .................. 2008-219634

(51) Int. Cl.
  *G02B 13/16* (2006.01)
  *A62B 1/04* (2006.01)
  *A61B 1/04* (2006.01)

(52) U.S. Cl. ............... 348/335; 348/65; 396/17

(58) Field of Classification Search .......... 348/45, 348/65, 72, 335; 396/17
See application file for complete search history.

(56) References Cited

U.S. PATENT DOCUMENTS

| | | | |
|---|---|---|---|
| 4,741,327 A | | 5/1988 | Yabe |
| 4,809,680 A | * | 3/1989 | Yabe .................. 600/130 |
| 4,832,003 A | * | 5/1989 | Yabe .................. 600/109 |
| 4,890,159 A | * | 12/1989 | Ogiu ................... 348/72 |
| 5,734,418 A | * | 3/1998 | Danna ................. 348/76 |
| 5,749,827 A | | 5/1998 | Minami |
| 5,940,126 A | * | 8/1999 | Kimura ................ 348/294 |
| 6,515,271 B1 | | 2/2003 | Shimizu |
| 2006/0084841 A1 | | 4/2006 | Minami |
| 2006/0132598 A1 | * | 6/2006 | Minami et al. .......... 348/76 |
| 2008/0088701 A1 | * | 4/2008 | Unsai et al. ............ 348/65 |
| 2009/0213212 A1 | * | 8/2009 | Nakamura ............. 348/65 |
| 2010/0231702 A1 | * | 9/2010 | Tsujimura et al. ....... 348/65 |
| 2011/0063427 A1 | * | 3/2011 | Fengler et al. .......... 348/65 |

FOREIGN PATENT DOCUMENTS

| | | |
|---|---|---|
| JP | 63-303580 | 12/1988 |
| JP | 05-268535 | 10/1993 |
| JP | 11-032982 | 2/1999 |

* cited by examiner

*Primary Examiner* — Rodney Fuller

(74) *Attorney, Agent, or Firm* — McDermott Will & Emery LLP

(57) ABSTRACT

An imaging apparatus includes: a lens; a solid-state imaging device having, on its top surface, an imaging area in which pixels for converting incident light to a signal are arranged in rows and columns, a vertical scanning circuit located adjacent to the imaging area in a row direction, a peripheral circuit for processing the signal read from the imaging area, and a plurality of terminals; and a prism placed directly on the imaging area for leading the incident light to the imaging area. Light exposure is adjusted by varying brightness of light output from a processor according to a magnitude of the signal output from the solid-state imaging device.

7 Claims, 8 Drawing Sheets

IMAGING APPARATUS

CROSS-REFERENCE TO RELATED APPLICATIONS

This application claims priority from Japanese Patent Application No. 2008-219634 filed on Aug. 28, 2008, which is hereby incorporated by reference in its entirety for all purposes.

BACKGROUND

A technique disclosed in this specification relates to a solid-state imaging device used in an imaging apparatus such as an electronic endoscope.

In recent years, electronic endoscopes which incorporate solid-state imaging devices are widely used. Electric endoscopes are used such as for examinations and minimally invasive surgery in the medical field, and a reduction in diameters of the electric endoscopes is demanded to reduce patients' discomfort and expedite post-operation recovery.

Japanese Laid-Open Patent Application Publication No. 11-32982 discloses an endoscope including a solid-state imaging device in which an imaging area provided with CCDs (Charge Coupling Devices) and peripheral circuits exist on one chip (first conventional technique). The provision of the imaging area and peripheral circuits on the same chip reduces the number of signal lines at an insertion portion of the endoscope, thereby making it possible to reduce the diameter of the distal end of the endoscope.

Japanese Laid-Open Patent Application Publication No. 63-303580 discloses an endoscope in which a CCD solid-state imaging device is provided at an insertion portion of the endoscope (second conventional technique). In the conventional endoscope, the optical axis of light incident from outside is bent to a right angle by a prism placed on an imaging area of the solid-state imaging device, and the light hits the imaging area vertically. The solid-state imaging device is positioned such that the substrate surface of the solid-state imaging device is parallel to the axis of the endoscope. This structure makes it possible to reduce the diameter of the insertion portion of the endoscope more than the structure in which the solid-state imaging device is positioned such that the substrate surface of the solid-state imaging device is perpendicular to the axis of the endoscope.

SUMMARY

According to the endoscope of the first conventional technique, it is possible to reduce the number of signal lines connected to the solid-state imaging device. However, the provision of the imaging area and the peripheral circuits on the same substrate may increase a width across corner of the substrate and result in an increase in diameter of the endoscope. On the other hand, the use of a CMOS sensor as the solid-state imaging device can achieve an easy integration of pixel circuits included in the imaging area and the peripheral circuits on the same substrate, thereby making it possible to reduce power consumption. However, a width across corner of the substrate is similarly increased and it is difficult to reduce the diameter of the endoscope to a satisfactory extent.

Moreover, in the case where the solid-state imaging device is positioned as in the second conventional technique, reduction in diameter of the insertion portion is restricted by the short side length (i.e., the length in a row direction) of the solid-state imaging device. However, the length of the conventional solid-state imaging device in the row direction cannot be reduced to a satisfactory extent especially in the case where a CMOS sensor is used as the solid-state imaging device. It is thus difficult to further reduce the diameter of the endoscope.

An example solid-state imaging device disclosed in this specification may be advantageous in reducing the diameter of an imaging apparatus, such as an endoscope.

A first example imaging apparatus of the present invention includes: a lens for collecting light incident from outside; a solid-state imaging device having on its top surface an imaging area in which pixels for converting the incident light to a signal are two-dimensionally arranged in a row direction and a column direction, a vertical scanning circuit, located adjacent to the imaging area in the row direction, for selecting the pixels from which the signal is read on a row by row basis, a peripheral circuit for processing the signal read from the imaging area, and a plurality of terminals including a signal terminal for outputting the signal; and a prism, placed directly on the imaging area, for bending an optical axis of the incident light that has passed through the lens and leading the incident light to the imaging area, wherein the peripheral circuit lies in a first direction from the imaging area, the first direction being one of opposite directions from the imaging area along the column direction, and the plurality of terminals lie in the first direction from the peripheral circuit, and an optical axis of the lens and the first direction are parallel to each other.

In this structure, the peripheral circuit and the plurality of terminals lie in the first direction from the imaging area, and the optical axis of the lens and the first direction are aligned to be parallel with each other. It is therefore possible to reduce the length of the solid-state imaging device in the row direction, and the diameter of the imaging apparatus can thus be reduced as well.

Particularly in the case where the imaging apparatus further includes: a processor for outputting light whose brightness is varied according to a magnitude of the signal output from the solid-state imaging device; and a light transmitting member for emitting the light output from the processor to the outside, it is possible to adjust light exposure according to the magnitude of the signal output from the solid-state imaging device. Thus, the vertical scanning circuit does not have to include a so-called electric shutter function, and the configuration of the vertical scanning circuit can be simplified. This makes it possible to reduce the length of the vertical scanning circuit in the row direction without increasing the length of the solid-state imaging device in the column direction. As a result, the diameter of the imaging apparatus can be reduced.

A second example imaging apparatus of the present invention includes: a solid-state imaging device having on its top surface an imaging area in which pixels for converting incident light to a signal are two-dimensionally arranged in a row direction and a column direction, and a vertical scanning circuit, located adjacent to the imaging area in the row direction, for selecting the pixels from which the signal is read on a row by row basis; a prism, placed directly on the imaging area, for bending an optical axis of the incident light and leading the incident light to the imaging area; a column ADC, provided for each column of the pixels, for carrying out an analog/digital conversion of the signal read from the pixels; a PS conversion circuit for converting the signal read in parallel from each row of the pixels into a serial signal; a horizontal scanning circuit for selecting the signal that is output from the pixels and sequentially outputting the signal from a signal terminal; a timing generator for supplying a control signal to the vertical scanning circuit and the horizontal scanning circuit; and one or more semiconductor chips positioned or stacked in a region on the solid-state imaging device that lies in a first direction from the imaging area, the first direction being one of opposite directions from the imaging area along the column direction, wherein the column ADC, the PS conversion circuit, the horizontal scanning circuit, and the timing generator are placed separately on the one or more semiconductor chips and at the region on the solid-state imaging device that lies in the first direction from the imaging area.

According to this structure, it is possible to reduce the length of the solid-state imaging device in the column direction by forming the peripheral circuits for signal readout separately on one or more semiconductor chips. In addition, the peripheral circuits are positioned in one of opposite directions from the imaging area along the column direction, when viewed from the above. Thus, if this solid-state imaging device is used in the imaging apparatus, it is possible to achieve an imaging apparatus of smaller diameter and higher mobility by reducing the length of the insertion portion.

In the above-described example imaging apparatus of the present invention, the peripheral circuit and the plurality of terminals are positioned in the first direction from the imaging area, and at the same time, the optical axis of the lens and the first direction are aligned to be parallel with each other. It is therefore possible to reduce the length of the solid-state imaging device in the row direction, and the diameter of the imaging apparatus can thus be reduced as well.

Particularly in the case where light exposure is adjusted according to the magnitude of the signal output from the solid-state imaging device, the vertical scanning circuit does not have to include a so-called electric shutter function, and the configuration of the vertical scanning circuit can be simplified. This makes it possible to reduce the length of the vertical scanning circuit in the row direction without increasing the length of the solid-state imaging device in the column direction. As a result, the diameter of the imaging apparatus can be greatly reduced.

DETAILED DESCRIPTION

First Embodiment

Overall Structure

Figure 1B:
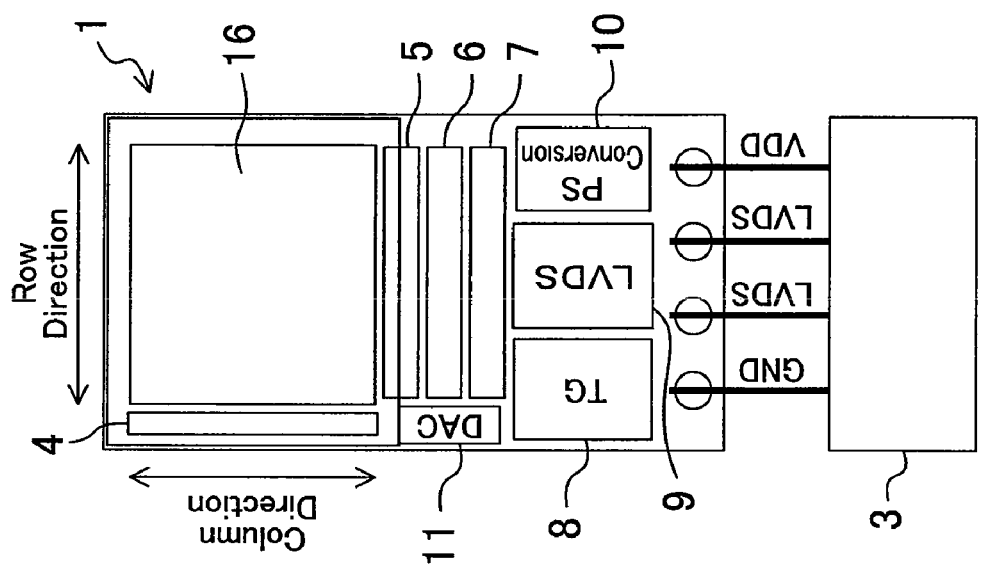
FIG. 1A and FIG. 1B are a side view and a plan view, respectively, which schematically illustrate a solid-state imaging device according to the first embodiment of the present invention.
Figure 1A:
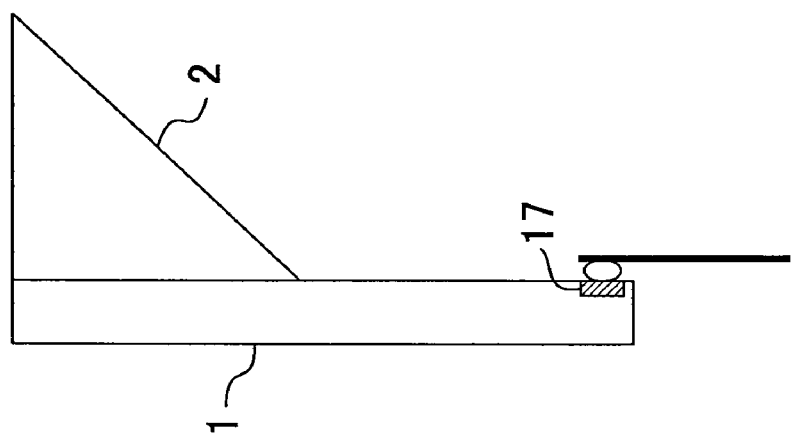
Figure 2:
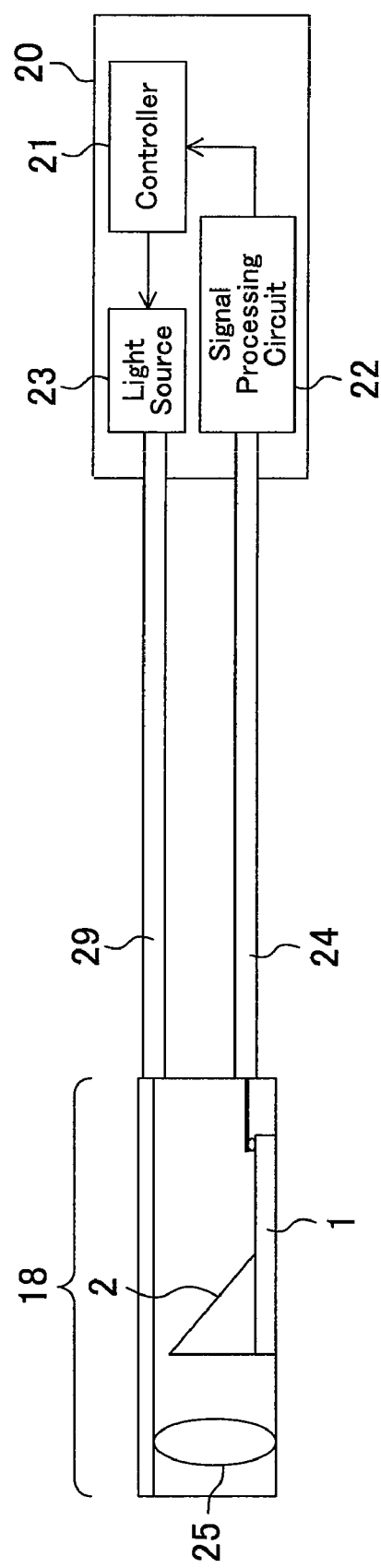
FIG. 2 shows a schematic structure of an imaging apparatus according to the first embodiment of the present invention.

FIG. 1A and FIG. 1B are a side view and a plan view, respectively, which schematically illustrate a solid-state imaging device according to the first embodiment of the present invention. FIG. 2 shows a schematic structure of an imaging apparatus according to the present embodiment that is equipped with the solid-state imaging device shown in FIG. 1A and FIG. 1B. FIG. 2 illustrates an endoscope as an example of the imaging apparatus. In the present specification, the vertical direction of FIG. 1 is referred to as a column direction (longitudinal direction) of a solid-state imaging device 1 and the horizontal direction of FIG. 1 as a row direction (transverse direction) of the solid-state imaging device 1.

As shown in FIG. 1A and FIG. 1B, the imaging apparatus of the present embodiment includes: a solid-state imaging device 1 having on its top surface an imaging area 16 which includes a plurality of light-receiving parts for carrying out photoelectric conversion; a prism 2, placed directly on the imaging area 16 of the solid-state imaging device 1, for bending an optical axis of incident light to a right angle and leading the incident light to the imaging area 16; and a plurality of terminals 17 positioned in a region on the solid-state imaging device 1 that lies in one of opposite directions (first direction) from the imaging area 16 along the column direction. The plurality of terminals 17 include a VDD terminal and a GND terminal for supplying, for example, supply voltage and ground voltage, respectively, to the solid-state imaging device 1, and a first LVDS (Low Voltage Differential Signaling) terminal and a second LVDS terminal for carrying out differential transmission of image signals output from the solid-state imaging device 1.

Integrated on the top surface of the solid-state imaging device 1 are the imaging area 16 and a vertical scanning circuit 4 located adjacent to the imaging area 16 in the row direction, as well as a column analog digital converter (column ADC) 5, a line memory 6, a horizontal scanning circuit 7, a parallel serial (PS) conversion circuit 10, a low voltage differential signaling (LVDS) circuit 9, a timing generator (TG) 8 and a digital analog converter (DAC) 11, which are positioned in one of opposite directions (first direction) from the imaging area 16 along the column direction. Signals generated in the light-receiving parts of the imaging area 16 are read by a signal readout circuit composed of a plurality of MOS transistors as described later. The signals are sequentially read from the light-receiving parts on a row by row basis by the vertical scanning circuit 4.

The signals output from the imaging area 16 are converted into digital signals by the column ADC provided for each column of light-receiving parts (pixels) and then converted into differential signals by the LVDS circuit 9 to be output from the first LVDS terminal and the second LVDS terminal (signal terminals). Timing of this signal output is controlled by the horizontal scanning circuit 7, and signals output from each column of light-receiving parts are converted into serial signals by the PS conversion circuit 10 before being output. The signals output from the solid-state imaging device 1 are transmitted to a signal processing circuit of an external device through a tape automated bonding (TAB) substrate 3. DAC 11 supplies the column ADC 5 with analog signals. The TG 8 supplies peripheral circuits, such as the vertical scanning circuit 4, DAC 11, column ADC 5 and horizontal scanning circuit 7, with given digital control signals.

According to the imaging apparatus of the present embodiment, a plurality of peripheral circuits, excluding the vertical scanning circuit 4, and a plurality of terminals 17 are positioned in the same direction (first direction) from the imaging area 16. It is thus possible to reduce the length of the solid-state imaging device 1 in the row direction more than it was possible in conventional solid-state imaging devices. Moreover, since the solid-state imaging device 1 of the present embodiment is a MOS sensor, it is easier to integrate the plurality of peripheral circuits and the imaging area 16 on the same substrate, compared to the case where a CCD sensor is used as the solid-state imaging device 1. As a result, it is possible to reduce the size of the solid-state imaging device 1 in plan view. The LVDS circuit 9 is not essential to the operation of the solid-state imaging device 1. However, the LVDS circuit 9 enables a high-speed serial data transmission and hence a great reduction in the number of pins. As a result, the length of the solid-state imaging device 1 in the row direction is not restricted by the number of input terminals and output terminals. In addition, signals can be transmitted using low voltage and small current, and thus, power consumption of the solid-state imaging device 1 can be greatly reduced.

As shown in FIG. 2, the imaging apparatus of the present embodiment has a flexible tubular part, and an insertion portion 18 is provided at one end of the tubular part. The insertion portion 18 includes a lens 25, a solid-state imaging device 1, a prism 2 and others. More specifically, the imaging apparatus of the present embodiment includes: the lens 25 for collecting light incident from outside; the solid-state imaging device 1 of the present embodiment shown in FIG. 1B; the prism 2; a cable 24 for transmitting signals output from the solid-state imaging device 1; a processor 20 for outputting light whose intensity is varied according to the magnitude of signals input through the cable 24; and an optical fiber (light transmitting member) 29 provided in the tubular part for emitting light output from the processor 20 from the insertion portion 18 to the outside.

The processor 20 includes a signal processing circuit 22 for processing the signals output from the solid-state imaging device 1, a light source 23 for outputting light to the optical fiber 29, and a controller 21 for controlling the intensity (brightness) of light to be output from the light source 23 according to the magnitude of signals processed by the signal processing circuit 22. For example, LEDs and lasers are used as the light source 23.

According to the imaging apparatus of the present embodiment, the solid-state imaging device 1 is positioned such that a side along the column direction (longitudinal side) of the solid-state imaging device 1 and the above-mentioned first direction are aligned with each other to be parallel (including deviations in placement) with the optical axis of the lens 25. As mentioned earlier, the length of the solid-state imaging device 1 in the row direction is reduced more than the length of a conventional solid-state imaging device in the row direction. Thus, the diameter of the insertion portion 18 is reduced more than the diameter of an insertion portion of a conventional endoscope, by applying the prism 2 as an optical system.

In the imaging apparatus of the present embodiment, if the magnitude of the signals output from the solid-state imaging device 1 is large, the amount of current flowing in the light source 23 is reduced to weaken the intensity of the outgoing light. If the magnitude of signals output from the solid-state imaging device 1 is small, the amount of current flowing in the light source 23 is increased to increase the intensity of the outgoing light. As explained, light exposure can be adjusted using the image signals output from the solid-state imaging device 1. The configuration of the vertical scanning circuit 4 in the imaging apparatus of the present embodiment can thus be simplified more than in the conventional imaging apparatuses, and for this reason, the length of the solid-state imaging device 1 in the row direction can be reduced more. In addition, the length of the solid-state imaging device 1 in the column direction is not changed from the case in which a typical vertical scanning circuit is used. Thus, the diameter of the insertion portion can be reduced without increasing the length of a hard, inflexible part of the insertion portion. A concrete configuration example of the vertical scanning circuit 4 is hereinafter described.

Example Configuration of Vertical Scanning Circuit

Figure 3:
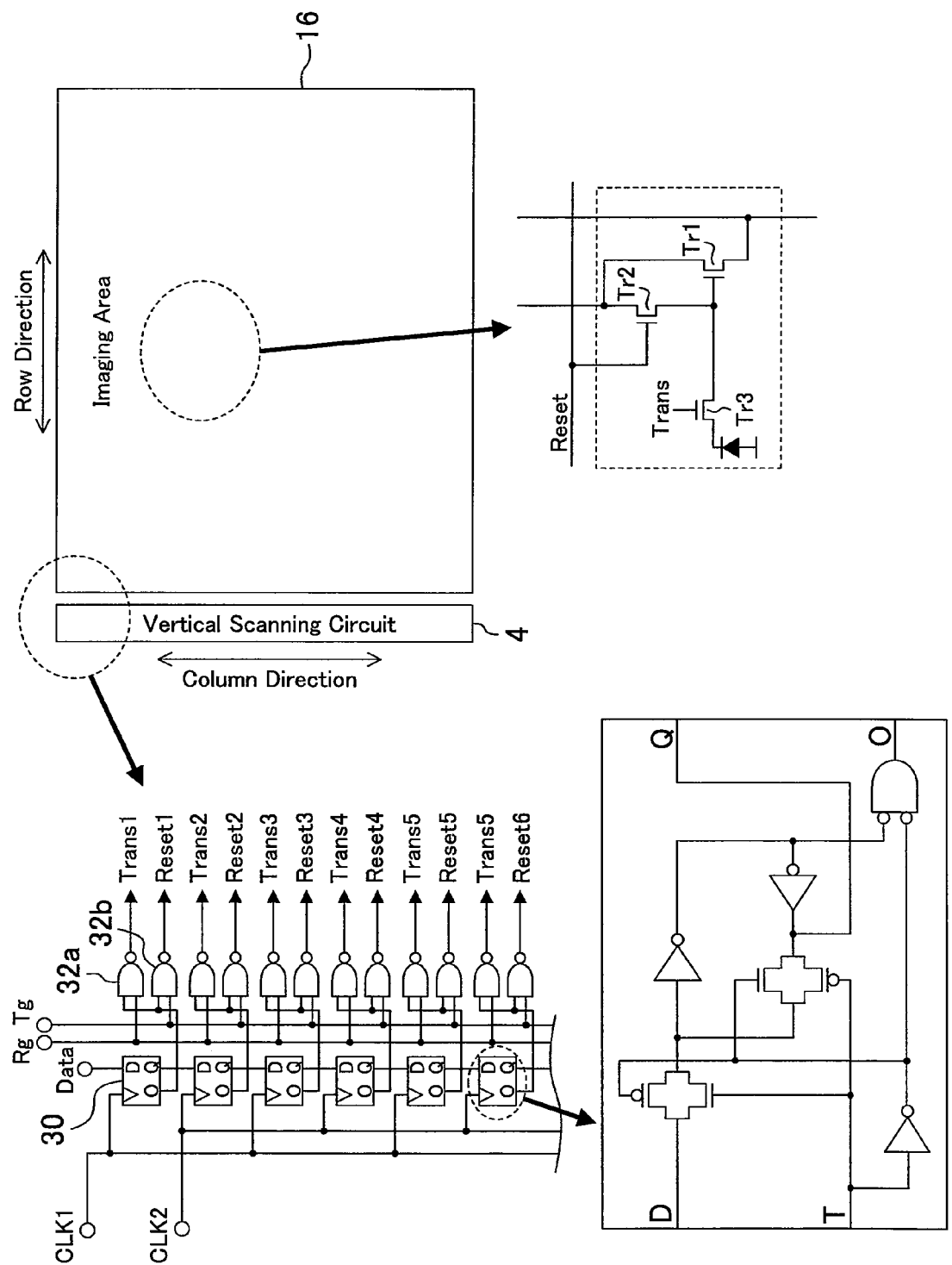
FIG. 3 shows a concrete configuration example of a vertical scanning circuit in the solid-state imaging device according to the first embodiment and an example configuration of each of pixels constituting an imaging area.

FIG. 3 shows a concrete configuration example of the vertical scanning circuit 4 in the solid-state imaging device of the present embodiment and an example configuration of each of pixels constituting the imaging area 16.

As shown in the lower right figure of FIG. 3, each of the pixels arranged in rows and columns in the imaging area 16 has a light-receiving part (e.g., photodiode), a transfer transistor Tr3, an amplifying transistor Tr1, and a reset transistor Tr2.

The vertical scanning circuit 4 shown in the upper left figure of FIG. 3 is composed of a shift register for receiving clock signals CLK1, CLK2 output from TG 8 and control data (referred to as "Data" in the upper left figure of FIG. 3) and of a plurality of first NAND gates 32a and a plurality of second NAND gates 32b, each of which receives an output of the shift register. The shift register is composed of latch circuits 30 and a latch circuit 30 is provided for each row of the pixels. A first NAND gate 32a is provided for each row of the pixels, and the first NAND gate 32a supplies a control signal Trans to a gate electrode of the transfer transistor on receipt of a control signal Rg and an output from a latch circuit 30 corresponding to the same row of the pixels. A second NAND gate 32b is provided for each row of the pixels, and the second NAND gate 32b supplies a control signal Reset to a gate electrode of the reset transistor on receipt of a control signal Tg and an output from a latch circuit 30 corresponding to the same row of the pixels. According to an example configuration of FIG. 3, the signal output timing of an odd-numbered latch circuit 30 from the top is controlled by the clock signal CLK1, and signal output timing of an even-numbered latch circuit 30 from the top is controlled by the clock signal CLK2. Each latch circuit 30 is configured by, for example, combining two transfer gates, three inverters, and one AND gate as shown in the lower left figure of FIG. 3. It is preferable that the circuit configuration of the latch circuit 30 takes up as little space as possible in order to reduce the diameter of the insertion portion of the imaging apparatus. With the above structure, the vertical scanning circuit 4 can sequentially select rows of pixels, downward or upward, to read signals from the pixels or reset the pixels.

Herein, conventional solid-state imaging devices include an electric shutter function for controlling light exposure, in addition to a shift register and a NAND gate for reading signals. It is therefore necessary to provide another pair of a shift register and a NAND gate in, for example, a vertical scanning circuit.

In contrast to this, according to the imaging apparatus of the present embodiment, light exposure can be controlled by adjusting the amount of light from the light source 23 using image signals. It is thus possible to omit the electric shutter function and greatly reduce the length of the vertical scanning circuit 4 in the row direction without changing the length of the vertical scanning circuit 4 in the column direction. It is therefore possible to reduce the diameter of the imaging apparatus without increasing the length of the hard part of the insertion portion and hence relieve pain of patients. According to this structure, the length of the vertical scanning circuit 4 in the row direction can be reduced to 200 μm or less if the process applies design rules of 0.18 μm or less, for example. In the solid-state imaging apparatus of the present embodiment, configuration of the vertical scanning circuit 4 is simplified more than in conventional solid-state imaging apparatuses, by utilizing the pixel configuration as described in the following.

Example Circuit Configuration for Pixel

Figure 4A:
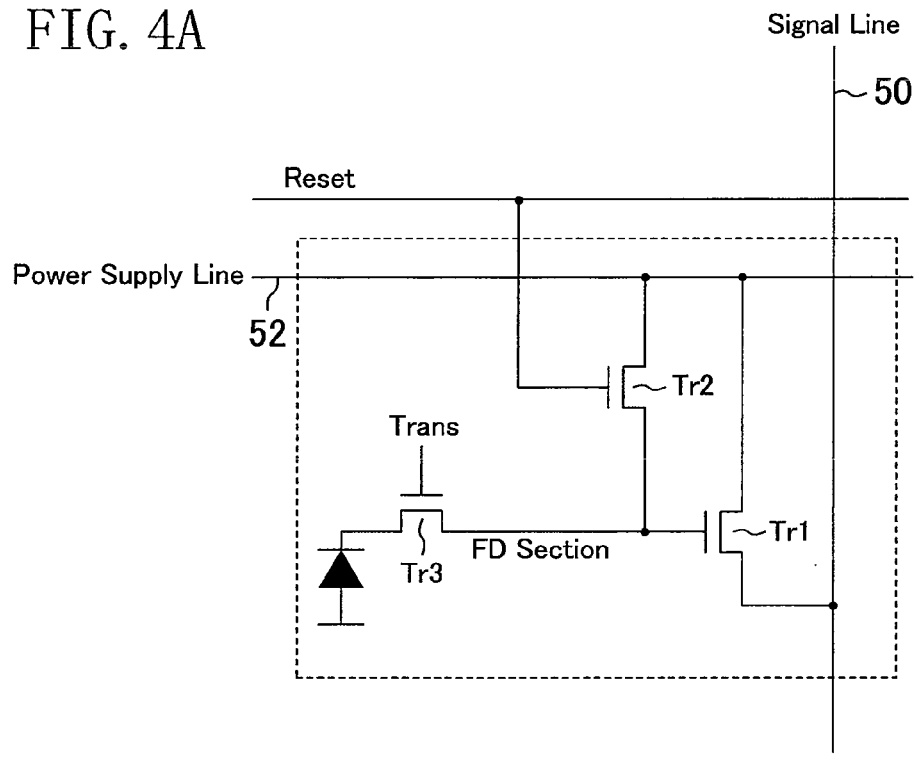
FIG. 4A shows a typical example of a pixel configuration when the pixel is composed of a light-receiving part and three MOS transistors.
Figure 4B:
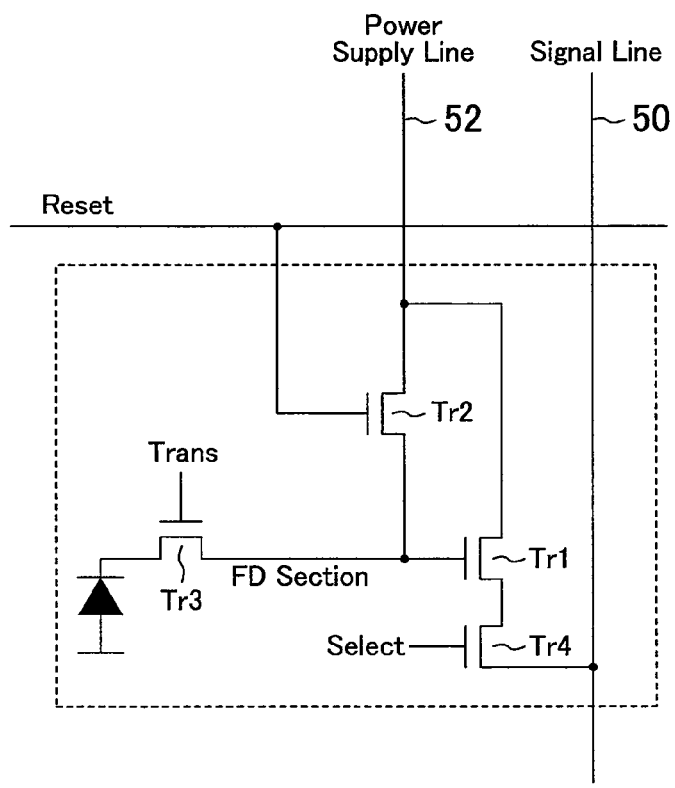
FIG. 4B shows a typical example of a pixel configuration when the pixel is composed of a light-receiving part and four MOS transistors.
Figure 5A:
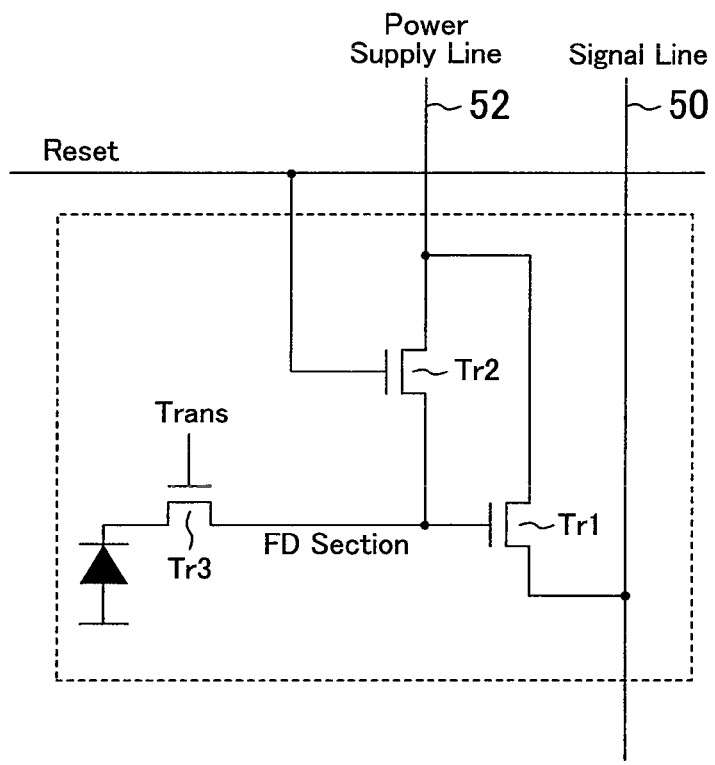
FIG. 5A shows an example circuit configuration for a pixel of the solid-state imaging device according to the first embodiment.
Figure 5B:
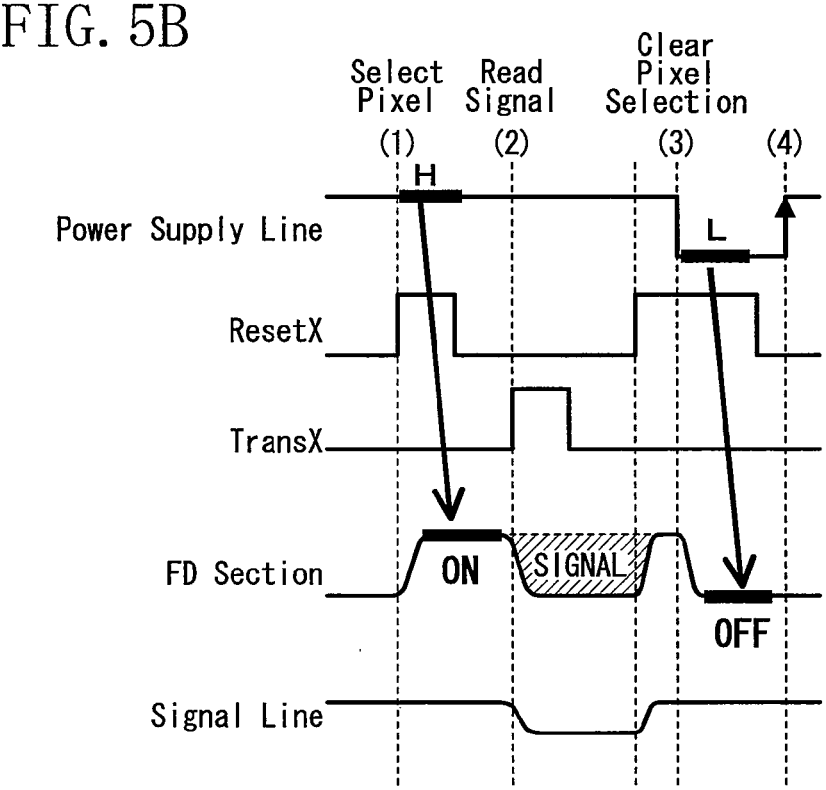
FIG. 5B shows a waveform diagram illustrating a signal readout operation in a pixel.

FIG. 4A shows a typical example of a pixel configuration when the pixel is composed of a light-receiving part and three MOS transistors. FIG. 4B shows a typical example of a pixel configuration when the pixel is composed of a light-receiving part and four MOS transistors. FIG. 5A shows an example circuit configuration for a pixel of the solid-state imaging device according to the present embodiment. FIG. 5B shows a waveform diagram illustrating a signal readout operation in a pixel.

In the case where the pixel is configured to include four transistors (a transfer transistor Tr3, an amplifying transistor Tr1, a reset transistor Tr2, and a select transistor Tr4) as shown in FIG. 4B, it is difficult to reduce the size of the pixel. Besides, it is necessary to transmit, from a vertical scanning circuit, three kinds of signals independent from one another, namely, signals for reading charge (Trans), signals for selecting a row (Select) and signals for resetting charge (Reset). Configuration of the vertical scanning circuit thus becomes complicated. In the example shown in FIG. 4A, a select transistor is not provided for each pixel. Thus, although pixel size may be reduced, it is necessary to transmit the three kinds of signals, that is, Trans, Select and Reset, from a vertical scanning circuit as in the example of FIG. 4B; it is therefore impossible to simplify the configuration of the vertical scanning circuit.

In contrast to this, according to the solid-state imaging device of the present embodiment, a power supply line 52 is connected to a drain of the reset transistor Tr2 and a drain of the amplifying transistor Tr1 without involving the vertical scanning circuit 4, as shown in the lower right figure of FIG. 3 and FIG. 5A. To raise the voltage of the power supply line 52 to high level at the timing described later, a voltage supplied from the VDD terminal shown in FIG 1B is supplied to the power supply line 52 through TG. Thus, the signals that need to be supplied from the vertical scanning circuit 4 to the pixels are only Trans applied to a gate electrode of the transfer transistor (first transistor) Tr3 and Reset applied to a gate electrode of the reset transistor (third transistor) Tr2. Configuration of the vertical scanning circuit 4 can thus be simplified as shown in the upper left figure of FIG. 3.

Signal Readout Operation from Pixels

According to the present embodiment, in order to select the $X^{th}$ row of pixels (X is a natural number), ResetX is raised to high level at Time (1) to turn on the reset transistor Tr2 as shown in FIG. 5B, and a high level voltage is applied to the power supply line 52 to fix a potential level of the FD (floating diffusion) section (i.e., a detection section) to high level. After that, ResetX is changed to low level to turn off the reset transistor Tr2. Then at Time (2), TransX is changed from low level to high level for a short period of time to turn on the transfer transistor Tr3 for a given period of time, thereby transferring signals accumulated in the light-receiving part to the FD section. The high level voltage remains in the drain of the amplifying transistor Tr1 (second transistor). Potential of the FD section is therefore varied according to the amount of charge accumulated in the light-receiving part, and potential of the signal line 50 connected to the source of the amplifying transistor Tr1 is accordingly varied. This variation in potential of the signal line 50 is sent to the column ADC as a signal. After that, ResetX is changed from low level to high level. Then at Time (3), the voltage applied to the power supply line 52 is changed to low level to turn off the amplifying transistor Tr1. By doing so, the selection of the pixels is cleared and the potential level of the FD section becomes low. At Time (4) the voltage applied to the power supply line 52 is raised to high level. Throughout the period from Time (1) to Time (4), both Reset and Trans are low levels in unselected rows of pixels.

Figure 6:
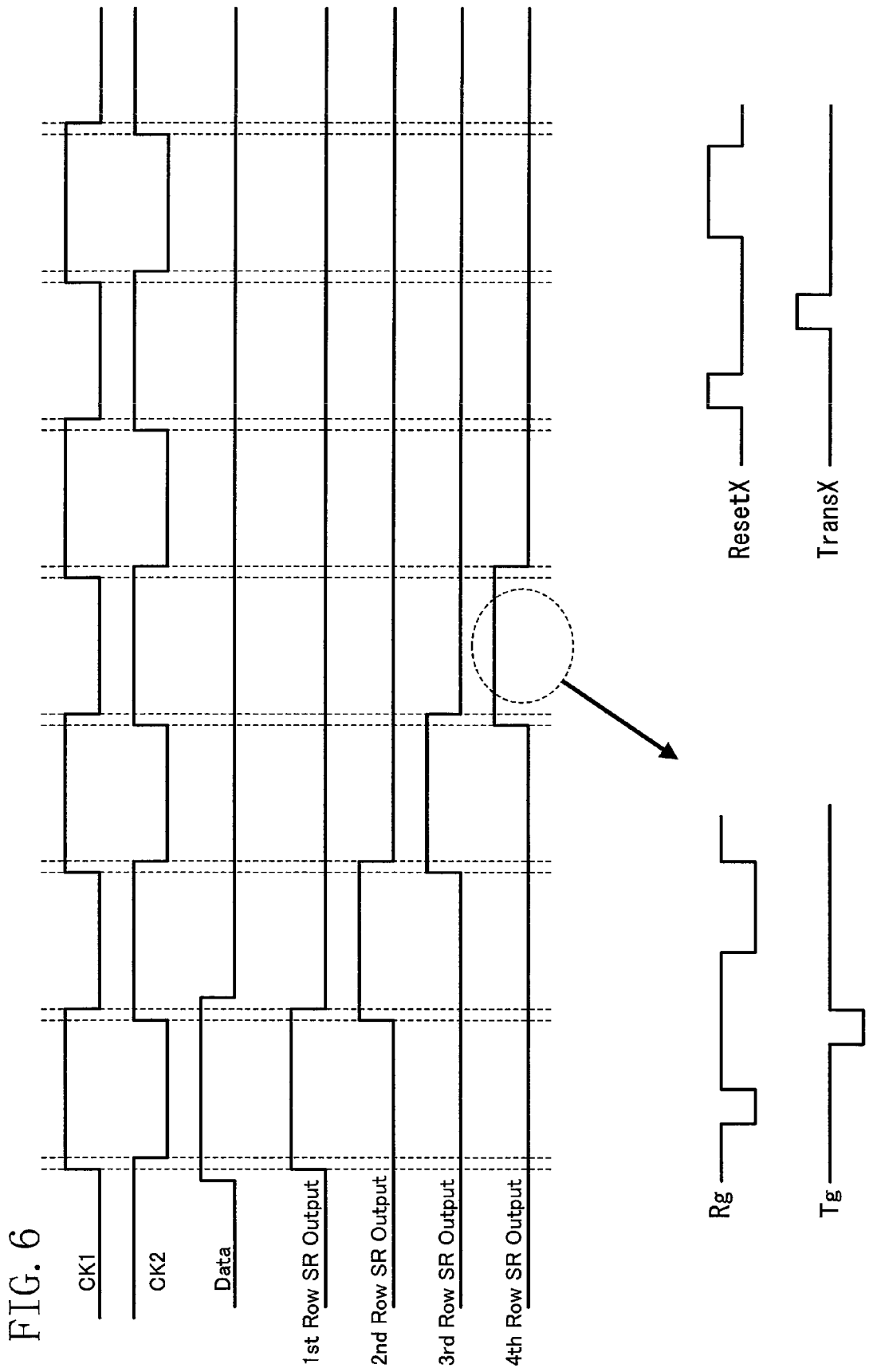
FIG. 6 shows a diagram illustrating a signal readout operation of a vertical scanning circuit in the solid-state imaging device according to the first embodiment.

FIG. 6 is a diagram illustrating a signal readout operation of the vertical scanning circuit. To carry out the above-described signal readout operation in sequence from the first row of pixels to the next row of pixels, a high level signal (Data) is input for a given period of time to the shift resistor of the vertical scanning circuit that corresponds to the first row of pixels, to change the clock signal CLK1 to high level and thereby raise the output of the shift resister corresponding to the first row of pixels to high level. During this operation, the control signals Rg and Tg are varied as illustrated in the lower left diagram of FIG. 6, and by doing so, ResetX and TransX illustrated in FIG. 5B and the lower right diagram of FIG. 6 are output from the vertical scanning circuit 4. On completion of the signal readout from the first row of pixels, the clock signal CLK 2 is changed to high level in order to raise the output of the shift resistor corresponding to the second row of pixels to high level, and a readout operation from the second row of pixels starts. Signals are sequentially read from each of the subsequent rows of pixels.

Configuration of Column ADC

Figure 7B:
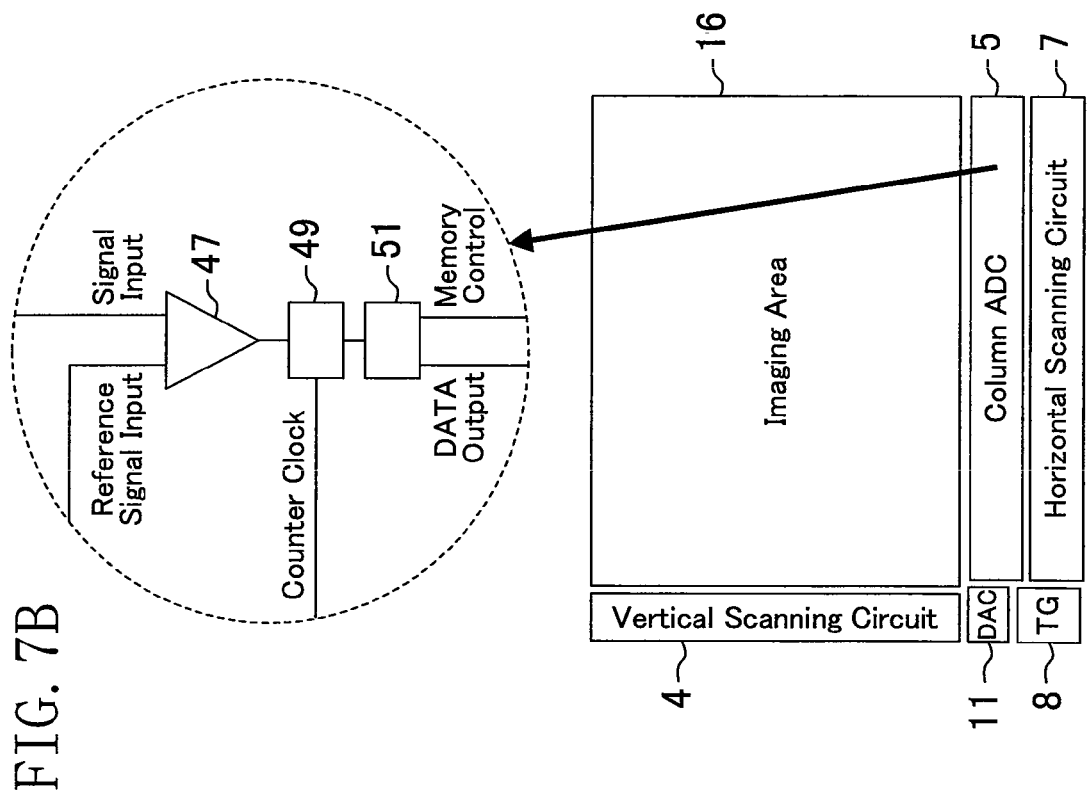
FIG. 7B shows an example layout of a solid-state imaging device in which a column ADC is provided for each column of pixels so that the column ADC may correspond to a signal line of each pixel column.
Figure 7A:
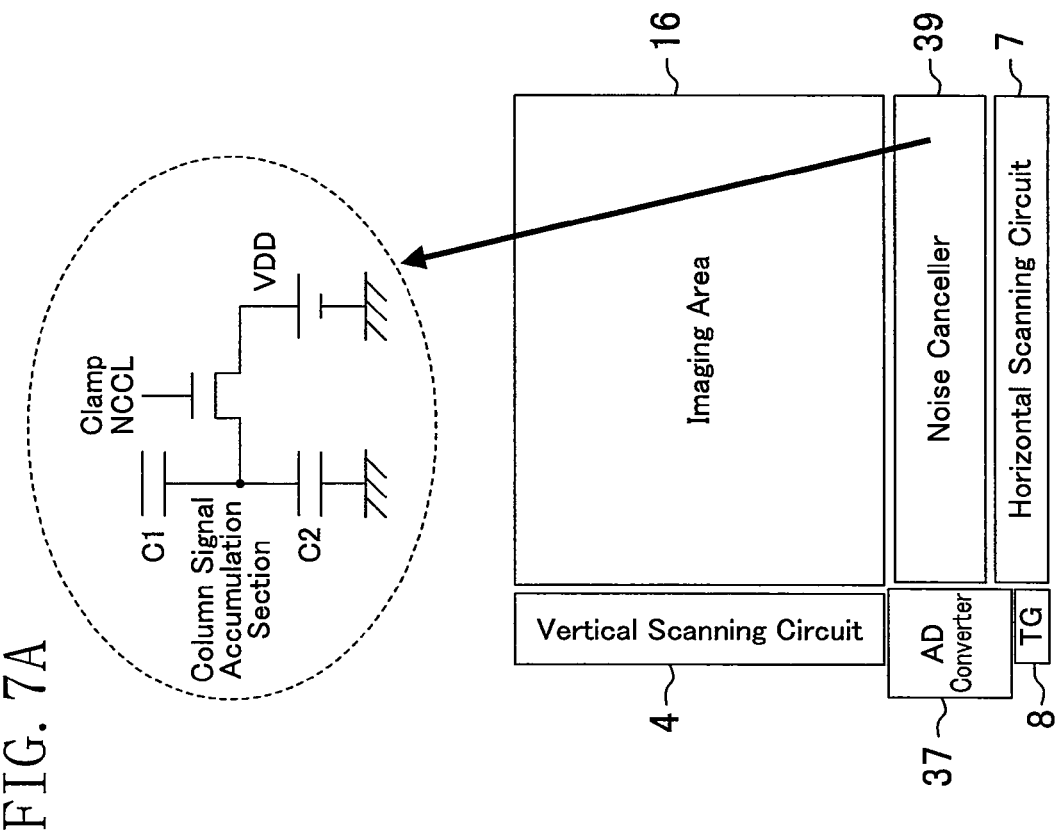
FIG. 7A shows an example layout of a solid-state imaging device in which analog signals read from pixels and converted into signal data are digitized.

FIG. 7A shows an example layout of the solid-state imaging device in which analog signals read from the pixels and converted into serial data are digitized. FIG. 7B shows an example layout of a solid-state imaging device in which a column ADC is provided for each column of pixels so that the column ADC may correspond to the signal line of each pixel column.

According to the configuration of FIG. 7A, signals from all the pixel columns are converted from analog to digital format by an AD converter 37 by one operation. It is thus necessary to provide a noise canceller 39 which includes column signal accumulation sections having capacitors C1 and C2 for each pixel column. The capacitors C1 and C2 have large plane areas; it is thus difficult to reduce the length of the solid-state imaging device in the column direction. Further, because the signals read from all the pixel columns are converted from analog to digital format by one operation, it is necessary to provide the AD converter 37 having a large area. It is therefore difficult to reduce the length of the solid-state imaging device in the row direction as well.

In contrast to this, the solid-state imaging device of the present embodiment utilizes a column ADC shown in FIG. 7B. The column ADC 5 is composed of column ADCs each corresponding to a column of pixels. Each of the column ADCs includes, for example: a comparator 47 to which a reference signal output from DAC 11 and a signal output from the pixels are input; an up-down (UD) counter 49 whose operation is controlled by a counter clock signal; and a memory 51 for storing an output from the UD counter 49. The operation of the memory 51 is controlled by the horizontal scanning circuit 7, and the digitized signals are sequentially sent to an output terminal. In this configuration, it is not necessary to provide the noise canceller 39 which includes capacitive elements having large areas; it is thus possible to reduce the length of the solid-state imaging device in the column direction. It is also not necessary to provide the AD converter 37 having a large area; it is thus possible to reduce the length of the solid-state imaging device in the row direction as well. The configuration of the column ADC 5 is not limited to the configuration illustrated in FIG. 7. Other configurations may be possible too, as long as they are capable of carrying out an analog-to-digital conversion for each column of pixels.

As described in the above, the length of the solid-state imaging device in the row direction can be reduced more greatly in the solid-state imaging device of the present embodiment than in the conventional solid-state imaging devices, and the length in the column direction can also be reduced to be equal or shorter than the length of the conventional solid-state imaging devices in the column direction. It is therefore possible to provide an imaging apparatus whose diameter is much shorter than the diameter of conventional apparatuses. This contributes to reduce pain of patients and further increases mobility of the imaging apparatus.

Although clock signals are generated in TG 8 in the example of FIG. 1B, the clock signals may be supplied from outside of the solid-state imaging device. Moreover, synchronization signals may be supplied from outside of the solid-state imaging device and the TG 8 may have the function of controlling frequencies of clock signals so that the clock signals may be synchronized with the synchronization signals. Further, in the case where the solid-state imaging device can function in a plurality of modes, such as still-picture shooting mode and motion-picture shooting mode, a function control signal for changing modes may be supplied from outside of the solid-state imaging device. In these cases, any of the plurality of terminals 17 may function as a terminal for the clock signals, function control signal or synchronization signal. If the solid-state imaging device is provided with a terminal for an input of the synchronization signal, the imaging apparatus of the present embodiment can be synchronized with external image equipment.

Second Embodiment

Figure 8:
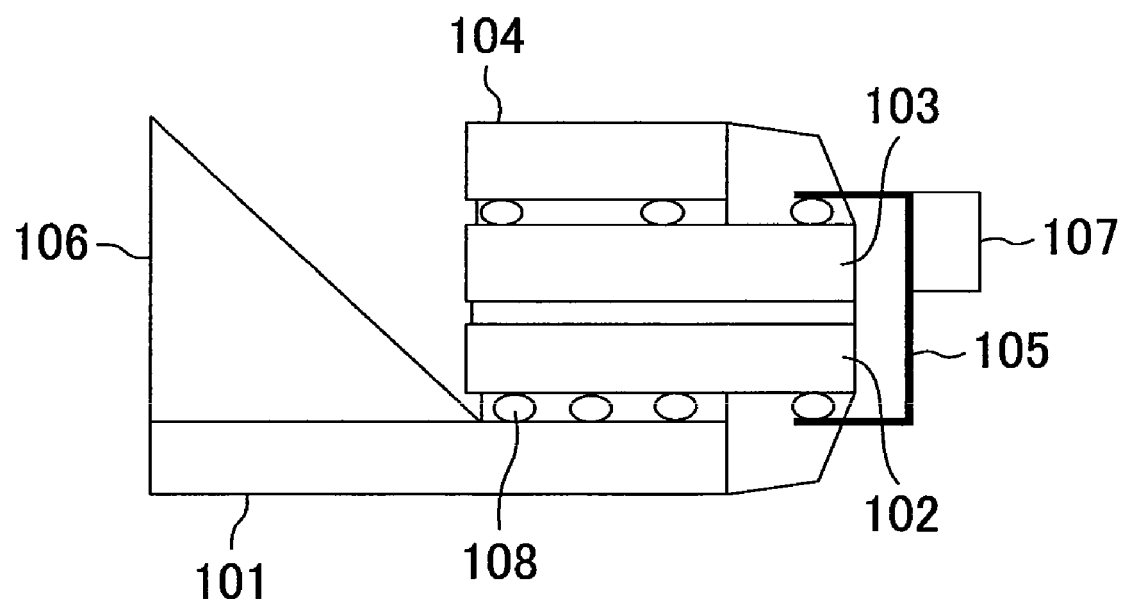
FIG. 8 is a side view which schematically illustrates a solid-state imaging device according to the second embodiment of the present invention.

FIG. 8 is a side view which schematically illustrates a solid-state imaging device according to the second embodiment of the present invention.

As shown in FIG. 8, an imaging apparatus of the present embodiment includes: a solid-state imaging device 101 having on its top surface an imaging area, a vertical scanning circuit, a column ADC and TG; a prism 106, placed directly on the imaging area of the solid-state imaging device, for bending an optical axis of incident light to a right angle and leading the incident light to the imaging area; a first semiconductor chip 102 which is flip-chip bonded on the top surface of the solid-state imaging device 101 with bumps 108; a second semiconductor chip 103 on the first semiconductor chip 102; a third semiconductor chip 104 bonded on the second semiconductor chip 103 such as with bumps.

A parallel-to-serial (PS) conversion circuit for converting the parallel signals read from a row of pixels into serial signals is provided on the first semiconductor chip 102. An LVDS circuit for converting the signals read from the pixels into differential signals is provided on the second semiconductor chip 103. A power supply IC for supplying supply voltage to the circuitry on the solid-state imaging device 101 is provided on the third semiconductor chip 104.

In the imaging apparatus of the present embodiment, the power supply IC and the LVDS circuit, and the circuitry on the solid-state imaging device 101 are electrically connected with bumps and a TAB substrate 105 having a capacitor 107.

As is the case with the solid-state imaging device of the first embodiment, the solid-state imaging device of the present embodiment is structured such that the column direction is parallel with the optical axis of the lens 25 in the imaging apparatus shown in FIG. 2. If the direction from the lens 25 towards the prism 106 is termed first direction, the first semiconductor chip 102, the second semiconductor chip 103 and the third semiconductor chip 104 are positioned in the first direction from the prism 106. It is preferable that these stacked semiconductor chips do not exceed the height of the prism 106 to avoid an increase in diameter of the imaging apparatus.

According to the above structure, the number of circuits on the solid-state imaging device 101 can be reduced more than in the solid-state imaging device according to the first embodiment. It is therefore possible to reduce the length of the solid-state imaging device 101 in the column direction and hence possible to reduce the length of the entire solid-state imaging device in the column direction. This makes it possible to reduce the length of the unbendable part of the insertion portion of the imaging apparatus. Thus, an imaging apparatus of higher mobility can be achieved by utilizing the solid-state imaging device of the present embodiment.

Three kinds of semiconductor chips are stacked on the solid-state imaging device 101 in the present embodiment. However, the number and kinds of the semiconductor chips are not limited to the above example, as long as the stacked semiconductor chips are within the surface of projection of the prism 106 when viewed from the front of the prism 106.

Moreover, where to position the circuits, such as the power supply IC, LVDS circuit, column ADC, PS conversion circuit, horizontal scanning circuit, and TG, is not limited to the above example, but they may also be positioned separately in the region on the solid-state imaging device that lies in the first direction from the imaging area and on one or more semiconductor chips formed on that region, in an arbitrary manner.

Accordingly, the solid-state imaging device of the present invention is useful in achieving a small-diameter image apparatus, such as an endoscope, for industrial, medical and other purposes.

The foregoing description illustrates and describes the present invention. Additionally, the foregoing description shows and describes only the preferred embodiments of the invention, but, as mentioned above, it is to be understood that it is capable of changes or modifications within the scope of the concept as expressed herein, commensurate with the above teachings and/or skill or knowledge of the relevant art. The above description is further intended to explain best modes known of practicing the invention and to enable others skilled in the art to utilize the invention in such, or other embodiments and with the various modifications required by the particular applications or uses disclosed herein. Accordingly, the description is not intended to limit the invention to the form disclosed herein. Also it is intended that the appended claims be construed to include alternative embodiments.

What is claimed is:

1. An imaging apparatus comprising:
a lens for collecting light incident from outside;
a solid-state imaging device having on its top surface an imaging area in which pixels for converting the incident light to a signal are two-dimensionally arranged in a row direction and a column direction,
a vertical scanning circuit, located adjacent to the imaging area in the row direction, for selecting the pixels from which the signal is read on a row by row basis,
a peripheral circuit for processing the signal read from the imaging area, and
a plurality of terminals including a signal terminal for outputting the signal; and
a prism, placed directly on the imaging area, for bending an optical axis of the incident light that has passed through the lens and leading the incident light to the imaging area, wherein
the peripheral circuit lies in a first direction from the imaging area, the first direction being one of opposite directions from the imaging area along the column direction, and the plurality of terminals lie in the first direction from the peripheral circuit, and
an optical axis of the lens and the first direction are parallel to each other.

2. The imaging apparatus of claim 1, further comprising:
a processor for outputting light whose brightness is varied according to a magnitude of the signal output from the solid-state imaging device; and
a light transmitting member for emitting the light output from the processor to the outside.

3. The imaging apparatus of claim 1, wherein the vertical scanning circuit includes one shift register and a logic circuit provided for each row of the pixels for receiving an output of the shift register.

4. The imaging apparatus of claim 1,
wherein each of the pixels includes:
a light-receiving part for converting the incident light to the signal;
a first transistor for transferring charge accumulated in the light-receiving part to a detection section;
a second transistor for amplifying the signal transferred to the detection section; and
a third transistor for resetting charge in the detection section, and
the solid-state imaging device further includes a power supply line for supplying a supply voltage that is supplied from outside of the solid-state imaging device, to drains of the second transistor and the third transistor directly or indirectly from a power supply terminal of the plurality of terminals, and
a control circuit for supplying a control signal to the vertical scanning circuit, the horizontal scanning circuit and the power supply line.

5. The imaging apparatus of claim 1, wherein the peripheral circuit includes a column ADC provided for each column of the pixels for carrying out an analog/digital conversion of the signal read from the pixels.

6. The imaging apparatus of claim 1, wherein the peripheral circuit includes:
a PS conversion circuit for converting the signal read in parallel from each row of the pixels into a serial signal;
a horizontal scanning circuit for selecting the signal that is output from the pixels and sequentially outputting the signal from the signal terminal; and
a timing generator for supplying a control signal to the vertical scanning circuit, the horizontal scanning circuit and the power supply line.

7. An imaging apparatus comprising:
a solid-state imaging device having on its top surface
an imaging area in which pixels for converting incident light to a signal are two-dimensionally arranged in a row direction and a column direction, and
a vertical scanning circuit, located adjacent to the imaging area in the row direction, for selecting the pixels from which the signal is read on a row by row basis;
a prism, placed directly on the imaging area, for bending an optical axis of the incident light and leading the incident light to the imaging area;
a column ADC, provided for each column of the pixels, for carrying out an analog/digital conversion of the signal read from the pixels;
a PS conversion circuit for converting the signal read in parallel from each row of the pixels into a serial signal;
a horizontal scanning circuit for selecting the signal that is output from the pixels and sequentially outputting the signal from a signal terminal;
a timing generator for supplying a control signal to the vertical scanning circuit and the horizontal scanning circuit; and
one or more semiconductor chips positioned or stacked in a region on the solid-state imaging device that lies in a first direction from the imaging area, the first direction being one of opposite directions from the imaging area along the column direction, wherein
the column ADC, the PS conversion circuit, the horizontal scanning circuit, and the timing generator are placed separately on the one or more semiconductor chips and at the region on the solid-state imaging device that lies in the first direction from the imaging area.

* * * * *